(12) United States Patent
Kurowska-Kalińska et al.

(10) Patent No.: US 12,436,017 B2
(45) Date of Patent: Oct. 7, 2025

(54) LEVEL SENSOR

(71) Applicant: Goodrich Corporation, Charlotte, NC (US)

(72) Inventors: Agata Kurowska-Kalińska, Kowale (PL); Piotr Kroczek, Nieciszów (PL); Dariusz Sapija, Kiełczówek (PL)

(73) Assignee: GOODRICH CORPORATION, Charlotte, NC (US)

( * ) Notice: Subject to any disclaimer, the term of this patent is extended or adjusted under 35 U.S.C. 154(b) by 204 days.

(21) Appl. No.: 18/178,895

(22) Filed: Mar. 6, 2023

(65) Prior Publication Data

US 2023/0288243 A1 Sep. 14, 2023

(30) Foreign Application Priority Data

Mar. 11, 2022 (EP) .................................. 22461524

(51) Int. Cl.
*G01F 23/00* (2022.01)
*G01F 23/16* (2006.01)
*H01H 35/34* (2006.01)

(52) U.S. Cl.
CPC .......... *G01F 23/164* (2013.01); *H01H 35/34* (2013.01)

(58) Field of Classification Search
CPC .............................. G01F 23/164; H01H 35/34
See application file for complete search history.

(56) References Cited

U.S. PATENT DOCUMENTS

| | | |
|---|---|---|
| 3,283,092 A | 11/1966 | Grostick |
| 4,742,194 A | 5/1988 | Legris et al. |
| 4,814,752 A | 3/1989 | Lehman |
| 5,728,928 A * | 3/1998 | Wisskirchen .......... G01F 23/14 |
| | | 73/1.73 |
| 6,536,277 B1 | 3/2003 | Chuang |
| 6,595,051 B1 | 7/2003 | Chandler, Jr. |

(Continued)

FOREIGN PATENT DOCUMENTS

| | | |
|---|---|---|
| DE | 102004033846 A1 | 2/2006 |
| FR | 2400192 A1 | 3/1979 |
| GB | 1321659 A | 6/1973 |

OTHER PUBLICATIONS

Abstract for DE102004033846 (A1), Published: Feb. 9, 2006, 1 page.

(Continued)

*Primary Examiner* — Jamel E Williams
(74) *Attorney, Agent, or Firm* — CANTOR COLBURN LLP

(57) ABSTRACT

A fluid level sensor assembly includes a first housing part having a fluid inlet and a fluid outlet and a fluid flow channel between the inlet and the outlet. The assembly also includes a sensor housing part formed on or integral with the first housing part and defining a sensing flow channel between a sensor end and a closed end, and has an opening from the sensing flow channel to the fluid flow channel of the first housing part. The assembly also includes level sensor components provided in the sensor flow channel at the sensor end, the level sensor components comprising: an actuator, and a switch component. The actuator and the switch component are arranged in the sensing flow channel such that when the pressure fluid in the fluid flow channel increases to increase the pressure in the sensing flow channel.

15 Claims, 4 Drawing Sheets

(56) References Cited

U.S. PATENT DOCUMENTS

| | | |
|---|---|---|
| 7,710,283 B1 | 5/2010 | Cantolino |
| 10,124,335 B2 | 11/2018 | Liang et al. |
| 2006/0266128 A1* | 11/2006 | Clark ................ A61M 5/16854<br>73/861.52 |
| 2010/0059344 A1* | 3/2010 | Belanger ................ G01F 23/74<br>200/61.2 |

OTHER PUBLICATIONS

Abstract for FR2400192 (A1), Published: Mar. 9, 1979, 1 page.
European Search Report for Application No. 22461524.5, mailed Aug. 30, 2022, 7 pages.

* cited by examiner

LEVEL SENSOR

CROSS-REFERENCE TO RELATED APPLICATIONS

This application claims priority to European Patent Application No. 22461524.5 filed Mar. 11, 2022, the entire contents of which is incorporated herein by reference.

TECHNICAL FIELD

The present disclosure is concerned with an assembly for sensing the level of a fluid such as, but not exclusively, water, oil, hydraulic fluid or gas. The disclosure is more particularly concerned with a fluid sensor for operating a valve in response to detection of a predetermined fluid level.

BACKGROUND

Fluid level sensing devices or assemblies find application in many fluid systems to detect fluid leakage or fluid exceeding or falling below a predetermined level. In response to such detection, valves or other fluid system parts can be opened or closed or regulated. For example, fluid level sensors can be used in water systems such as sanitation systems or appliances to detect rising fluid levels and to open a valve to release fluid or close a valve to prevent further fluid flow when the fluid level exceeds a certain level. Fluid level sensors may also detect levels of fluid in part of a system that indicate leakage of fluid, in response to which flow in the system can be controlled. Fluid can encompass any liquid, gas or air.

Fluid level sensors can be used in combination with many types of fluid systems and parts, including various types of valve. One type of valve is a motorised valve that is opened and closed by operation of a motor in response to electric signals provided to the motor.

Typically, a fluid sensor assembly includes some sort of switch or trigger, e.g. a mechanical or electrical switch or a micro-switch, that is opened or closed when the fluid reaches a predetermined level. The switch position results in a signal being sent to control another part of the system such as a valve or a fluid supply, a power supply, an alarm or alert or other system part that is to respond to a given fluid level.

Typical level sensor assemblies are shown e.g. in U.S. Pat. Nos. 6,536,277, 7, 710,283 and U.S. Pat. No. 10,124,335. Such systems typically include a switch external to the fluid flow part of the fluid system and a float in the fluid part of the system, the float being design to engage with or contact the switch to trip the switch when the float is at a position close to the switch. The float floating in the fluid is displaced as the level of fluid in the system changes. At the predetermined level of fluid, the float is designed to contact the external switch to trigger the switch, which then provides a signal to other system parts e.g. to control the opening or closing of a valve.

A problem with such arrangements is that the float located in the fluid system needs to be relatively large and able to move into engagement with the external switch and so is not suitable for use in all fluid systems. Furthermore, electronic sensors will usually need an additional power supply. Such assemblies are relatively complex and bulky, require a number of individual components and, where more parts are used, there is a greater risk of failure.

There is, therefore, a need for an improved fluid level sensor assembly that overcomes these problems.

SUMMARY

According to the present disclosure, there is provided a fluid level sensor assembly comprising: a first housing part having a fluid inlet and a fluid outlet and a fluid flow channel between the inlet and the outlet; a sensor housing part formed on or integral with the first housing part and defining a sensing flow channel between a sensor end and a closed end, and having an opening from the sensing flow channel to the fluid flow channel of the first housing part; and level sensor components provided in the sensor flow channel at the sensor end, the level sensor components comprising: an actuator, and a switch component, the actuator and the switch component being arranged in the sensing flow channel such that when the pressure fluid in the fluid flow channel increases to increase the pressure in the sensing flow channel, via the opening, the pressure in the sensing flow channel moves the actuator into engagement with the switch component to activate the switch component to provide a level detection indication.

In an example, the switch component may a push-button switch having a push button extending into the sensing flow channel, with which the actuator is brought into engagement to activate the switch component. The switch component may include a switch housing from which the push button extends, the switch housing containing switching circuitry and being configured to close the sensor end of the sensor housing part. The switch component may include a micro-switch.

In an example, a plug may be arranged to be received in the sensing flow channel and configured to securely receive the switch component.

Different types of actuator are possible, for example a plunger movable along the sensing flow channel responsive to the increased pressure, or an expandible part such as a diaphragm that is caused to expand in shape along the sensing flow channel towards the switch component as the pressure increases.

The first housing part and the sensor housing part may be formed as a single unit by additive manufacturing.

Also provided is a fluid flow system including a fluid flow conduit and a fluid level sensing assembly positioned within and along the fluid flow conduit such that fluid flows from a first flow part of the conduit into the fluid inlet and from the fluid outlet into a second flow part of the conduit.

The assembly may have a valve that opens and closes in response to a level of fluid detected by the fluid level sensing assembly.

The fluid level sensing assembly may be formed as a separate unit and then fitted between the first and second flow parts of the conduit. Alternatively, the sensing assembly may be formed together with the fluid flow conduit.

BRIEF DESCRIPTION

Examples of the fluid level sensing assembly according to the disclosure will be described by way of example only with reference to the drawings. It should be noted that these are examples only and variations are possible within the scope of the claims. The assembly is described here in the context of use with a motorised valve assembly, but the same principles may be used in other fluid assemblies or systems.

DETAILED DESCRIPTION

Figure 1:
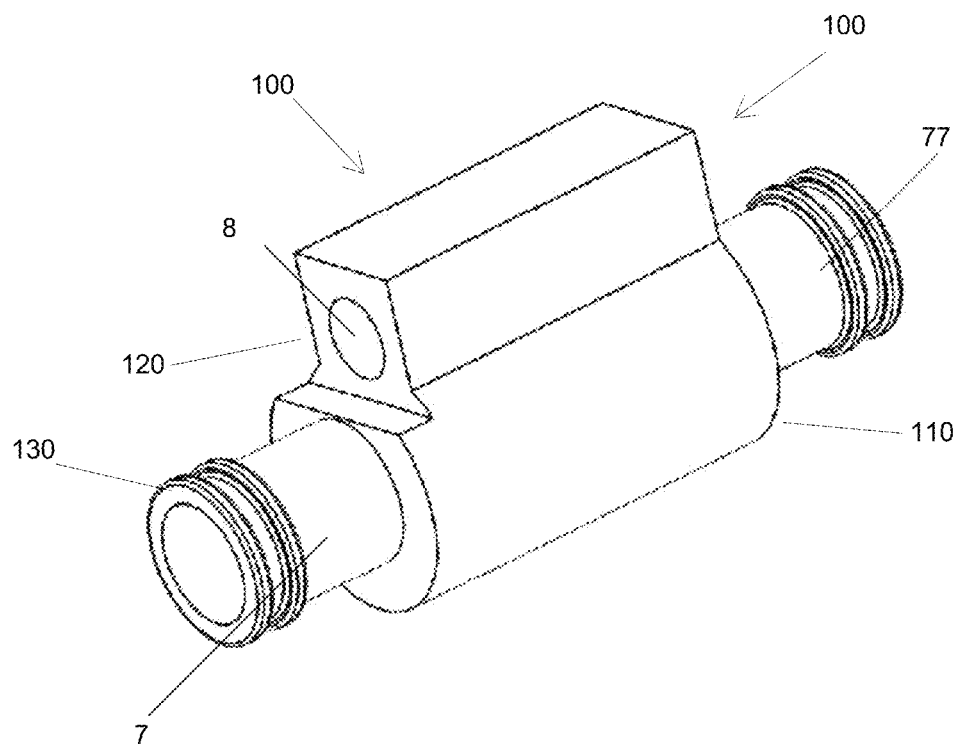
FIG. 1 is a perspective view of a level sensor assembly according to the present disclosure.
Figure 2:
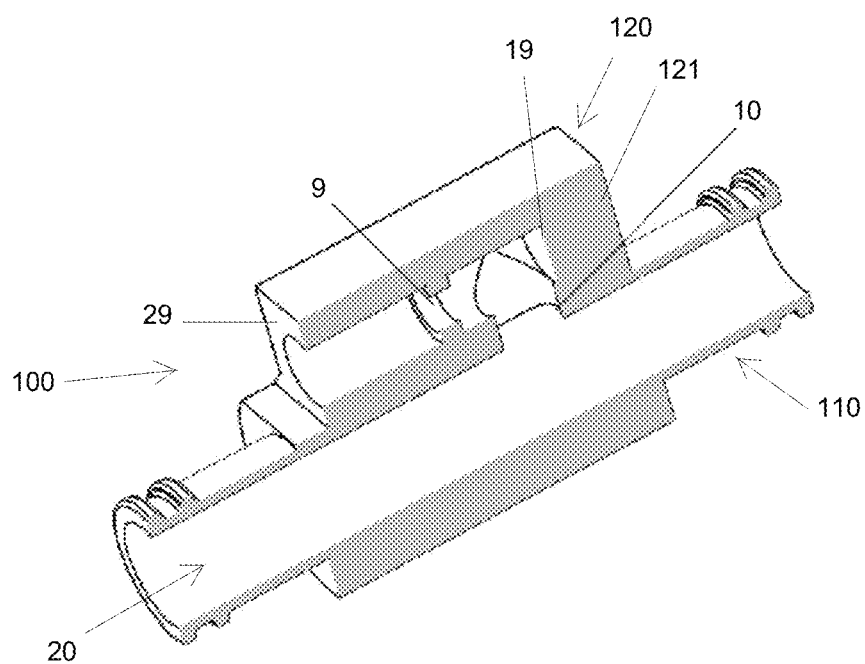
FIG. 2 is a sectional view of the housing of an assembly such as shown in FIG. 1.

The fluid level sensor assembly of the disclosure is designed to be arranged within the fluid flow system—i.e. integrated with the pipes or conduits through which the fluid flows. The assembly comprises a housing 100 configured to be fitted into a fluid flow conduit of the system, the housing 100 having a first housing part 110 which defines a flow path or fluid flow channel 20 for the fluid between an inlet 7 and an outlet 77. The inlet and outlet are configured to be fitted into the flow path of the system into which the sensor assembly is to be integrated. For example, the inlet 7 and the outlet 77 could be formed with threads that engage with corresponding threads on conduits of the system. Alternatively, the inlet and outlet could be fitted to the system by push fit or other mating techniques, with or without the use of clam-shells. The shape of the inlet and outlet can be made compatible with any known systems. Seals 130 may be provided to ensure a fluid-tight fitting of the housing to the system. The assembly housing 100 also includes a sensor housing part 120 mounted to or formed integrally with the first housing part 110. The sensor housing part defines a sensing flow channel 9 that opens into fluid flow engagement with the fluid flow channel 20 in the first housing part 110. One end 19 of the sensing flow channel 9 is closed by an end wall 121 of the sensor housing part 120. The other end 29 is open to receive the sensor components as described further below. The opening 10 between the sensor housing part 120 and the first housing part 110 is between the two ends 19, 29. In this example, the housing is formed as a unit for assembly into a fluid system. In other examples, the first housing part and the sensor housing part can be formed as an integral part of the fluid system design.

Figure 3:
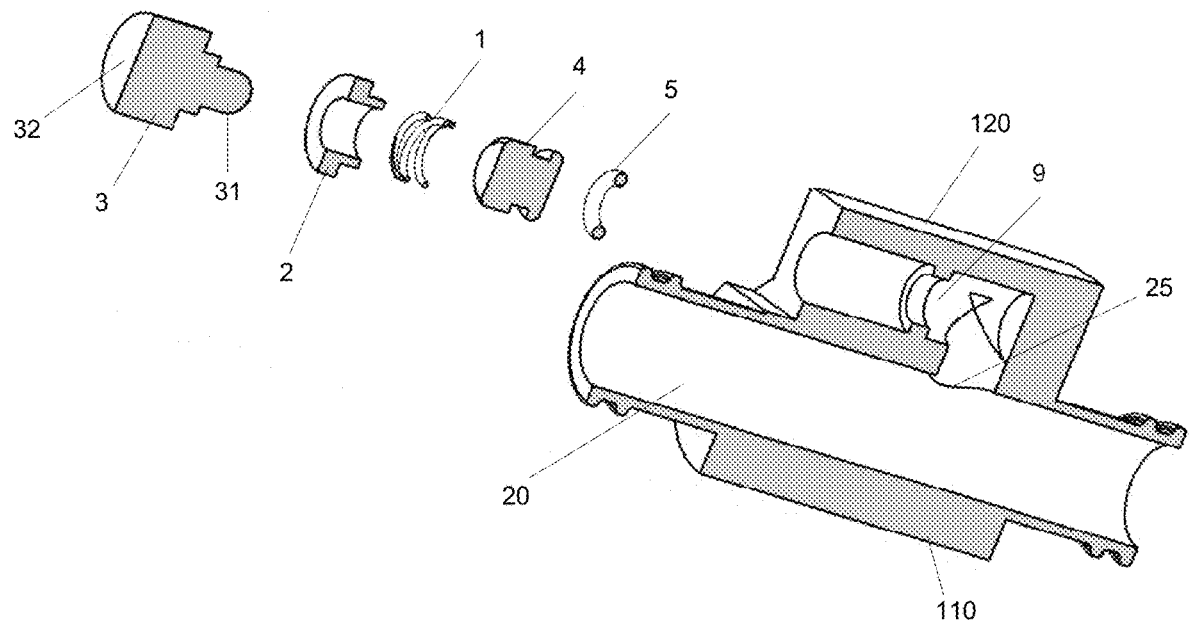
FIG. 3 is an exploded section view of an assembly according to the disclosure.
Figure 4:
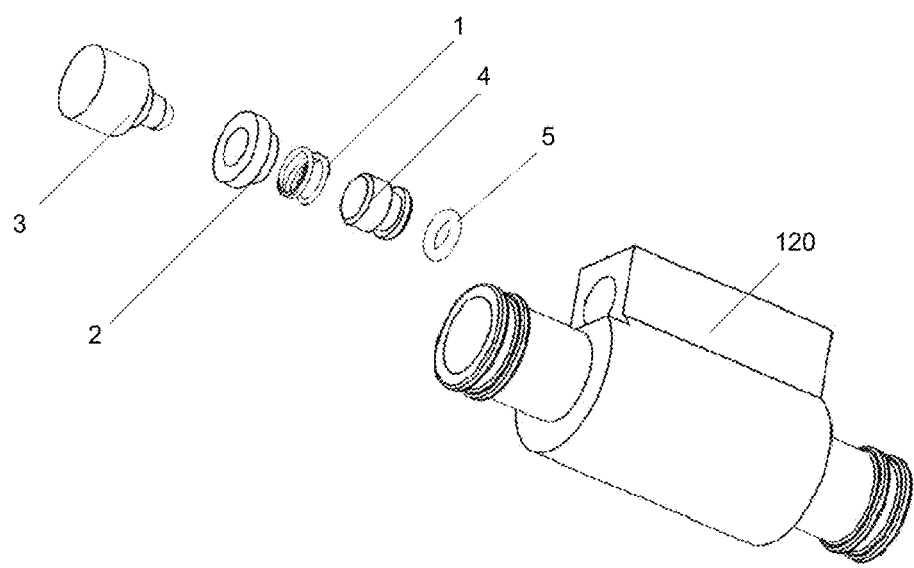
FIG. 4 is an exploded three-dimensional view of an assembly according to the disclosure.

FIGS. 3 and 4 show, in cross-sectional view and perspective view, respectively, the sensor components that are provided in the sensing flow channel 9 to provide the level sensing function.

The sensor components include an actuator 4 and a switch component 3 that is activated by the actuator 4 moving into engagement with the switch component within the sensing flow channel 9. Various switch designs can be envisaged; all that is required is that the assembly includes an actuator 4 that will extend along the sensing flow channel 9 under the pressure of fluid entering that channel from the fluid flow channel 20, and a switch that is activated by the actuator being brought into contact with the switch component 3.

In the example shown in FIGS. 3 and 4, the switch component is a push-button-type switch such as a microswitch having a protrusion or push button 31 extending from a switch housing 32 containing the switch electronics. The actuator 4 moves along the sensing flow channel 9, under the pressure of fluid in that channel, towards the switch component 3, and when it reaches the push-button 31 this is pressed by the actuator to activate the switch. Whilst microswitches are discussed here, it is also feasible that the switch is a mechanical switch that is activated by the actuator pushing against the protrusion 31.

The switch components may also include a plug 2 which fits into the sensing flow channel 9 in a tight fit and which receives the switch component 3 to secure the switch component in place in the sensing flow channel. The plug 2 has a hole through which the push-button 31 extends to be contacted by the actuator 4. A spring 1 may also be provided between the actuator 4 and the plug 2 or the switch component 3 to bias the actuator back to its start position out of contact with the switch component when the pressure acting on the actuator towards the switch is removed. Seals such as an O-ring seal 5 are preferably also provided around the sensing components to avoid leakage of the fluid from the open end 29 of the sensor housing part 120.

The sensor components are all mounted in the sensing flow channel from the open end 29 and are secured in place in the channel. The sensing components extend only part of the way along the sensing flow channel such that there is a space between the actuator 4 and the closed end 19 of the sensing flow channel into which fluid can enter from the fluid flow channel 20 via an opening 10 between the two housing parts. The side of the switch component 3 opposite the push-button 31 may be shaped to form a closure at the end of the sensing flow channel 9. It is also possible, that the switch component housing 32 is fitted fully within the sensing flow channel 9.

In its normal, non-activated state, in the example shown, the sensor is arranged such that the actuator 4 is out of engagement with the switch component 3, e.g. under the force of the spring 1 where this is present.

It could, alternatively, be envisaged that the sensor is configured to detect a level of fluid below a predetermined level e.g. in the case of leakage. In that case, the default state may be that the sensing flow channel is filled with fluid and so the actuator, in the normal state, presses the switch component. In the event of an under-pressure, the actuator moves out of engagement with the sensor component 3 and the opening of the switch may be the trigger event in that case.

The operation of the fluid level sensor assembly of the disclosure will be described further, by way of example, with reference to FIGS. 5A to 5C.

Figure 5A:
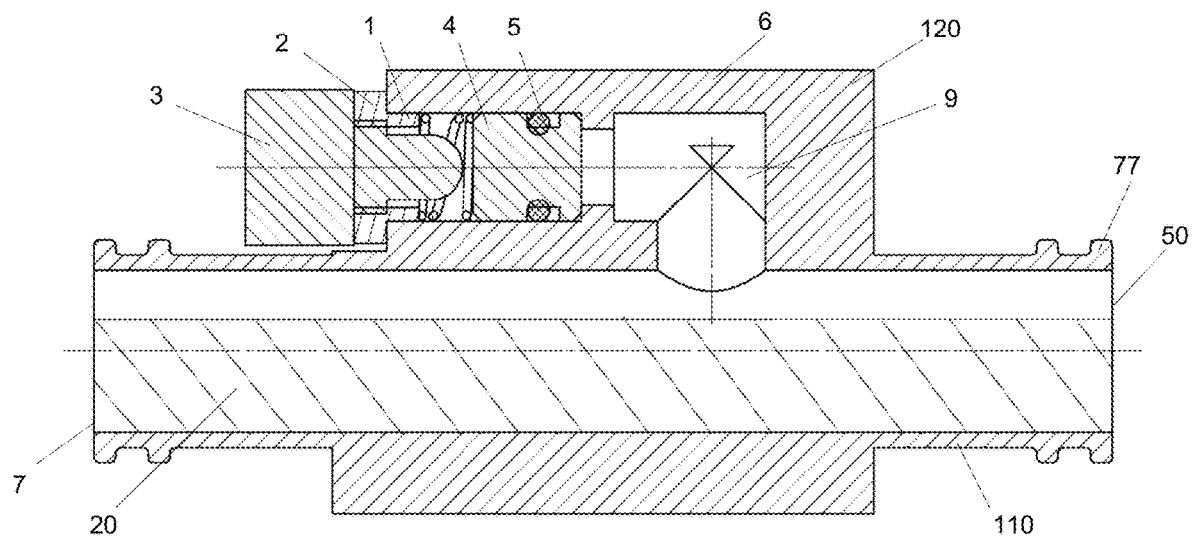
FIGS. 5A, 5B and 5C are sectional view of an assembly according to the disclosure with different levels of fluid.
Figure 5B:
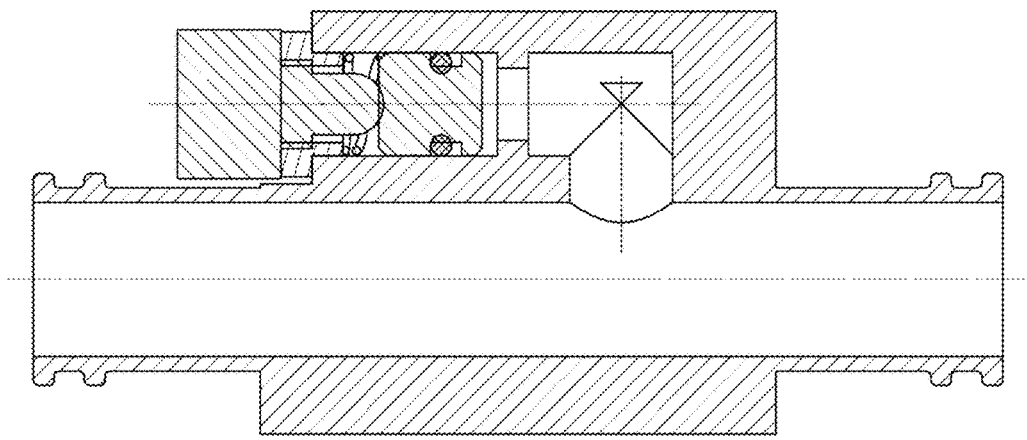
Figure 5C:
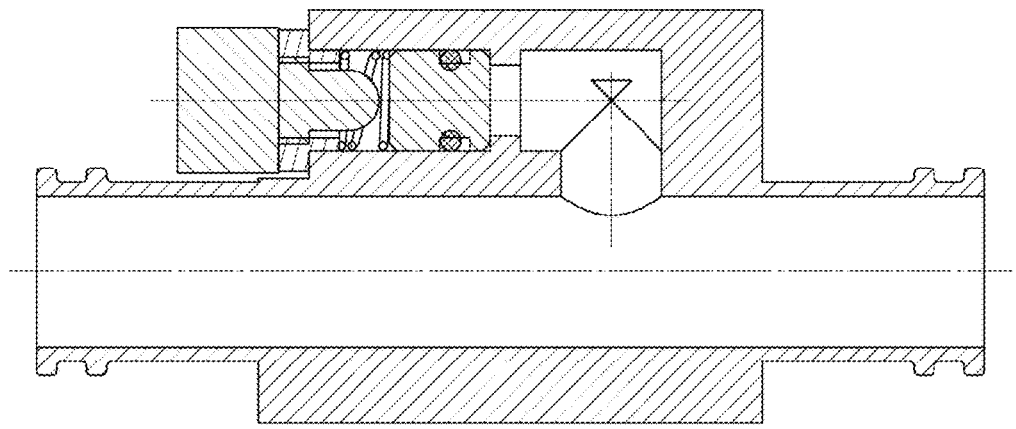

FIG. 5A shows the assembly where fluid flows in the fluid flow channel 20 and the channel is closed at the outlet 77 e.g. by a valve 50. The fluid in the flow channel has, at this stage, not reached an excessive pressure level or fluid level. In this state, the sensor components are arranged in the sensing flow channel 9 such that the actuator 4 is not in contact with the switch component 3, or, in this case, (i.e. having a push-button switch), does not push against the push button 31. In this example, the spring 1 is biased to hold the plunger out of contact with the switch component 3. The switch component 3 is, therefore, not activated and does not send any level detection signal.

As the fluid fills the flow channel 20 and the valve or end 50 is still closed, the pressure increases and the fluid is forced through the opening 10 into the sensing flow channel 9. The increase in pressure or fluid in the sensing flow channel 9, which is closed at one end 19, creates a force that pushes against the actuator 4, against the force of the spring 1 (if present), in the direction of arrow A in FIG. 5B. This causes the actuator 4 to contact the switch component 3. In the case of the push-button switch shown in this example, the actuator pushes against the push-button 31 to close the electrical circuit in the switch and causes the switch component 3 to generate a level detect signal L. The switch electronics/circuitry are standard and will not be described further.

This signal can be used to electrically control another part of the system in response to the level detection. In one example, as shown, the signal L may be used to open the valve 50 to release pressure in the fluid flow channel.

The fluid is then able to exit the fluid flow channel via the output 77 which, in turn, relieves the pressure acting on the actuator 4 as the fluid level or pressure level in the sensing flow channel 9 drops. The actuator then moves away from the switch e.g. under the force of the spring 1, to turn the switch off and the valve can again be closed (FIG. 5C).

As mentioned above, in other applications, the switch may cause a valve to close in response to a level detection, rather than open, or the level detection signal may be used to activate an alert, or disconnect a power supply or a fluid supply or some other function.

Figure 6A:
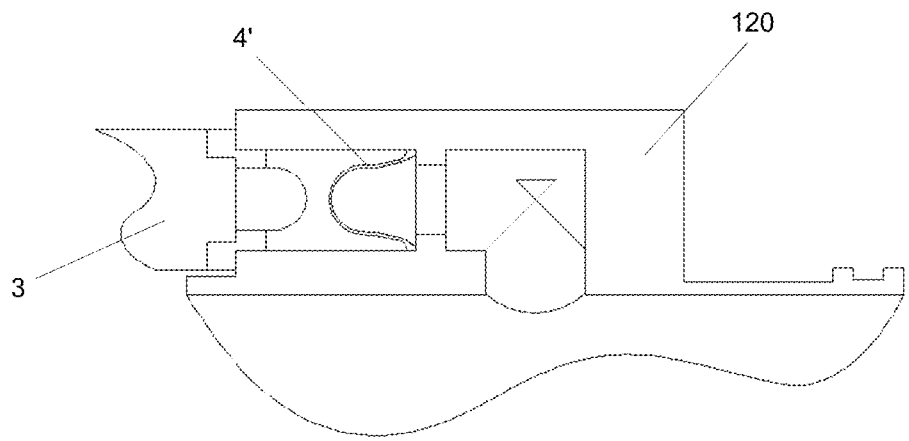
FIGS. 6A and 6B are sectional views of an alternative assembly according to the disclosure.
Figure 6B:
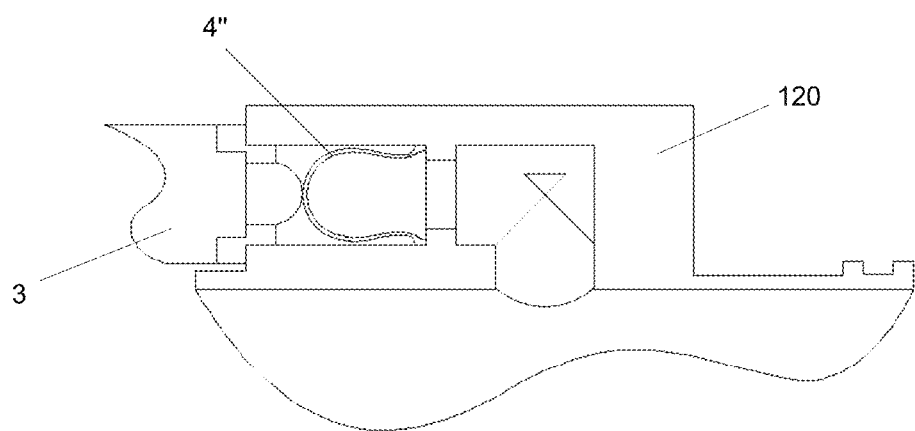

In the example above, the actuator 4 is a movable plunger, rod or piston-type part, optionally in combination with a spring 1. In an alternative design, as shown in FIGS. 6A and 6B, the actuator 4 may be in the form of an expandable component 4' such as a diaphragm or membrane or a bellows or balloon-type part which expands in shape, along the sensing flow channel (direction A), due to the increased pressure or fluid level in the sensing flow channel 9. In the non-activated stated (described in relation to FIG. 5A above, the pressure acting on the fluid side of the diaphragm or the like 4' is not sufficient to expand the component as far as the switch component in the sending flow channel 9 (FIG. 6A). As the pressure in the channel 9 increases, however, it fills the component and causes it to expand 4'' until it reaches and contacts the switch component 3 as shown in FIG. 6B. As pressure is removed, the component 4' reverts to its non-expanded form. Other than the design of the actuator, operation of the assembly is as described above.

The housing 100 can be formed by additive manufacture in a single unit, in which case there would be no need for any additional sealing between the flow channel and the sensing channel. Using additive manufacturing also reduces the weight and cost of the assembly.

The assembly of the disclosure provides a simple, easily integrated level sensing device that can be easily manufactured and assembled. The design includes few parts and is less liable to corrosion and wear than known arrangements. The sensor does not require a separate power supply. The assembly can be manufactured as a separate unit for fitting to an existing system or can be formed as part of a designed system.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A fluid level sensor assembly comprising:
a first housing part having a fluid inlet and a fluid outlet and a fluid flow channel between the inlet and the outlet;
a sensor housing part formed on or integral with the first housing part and defining a sensing flow channel between a sensor end and a closed end, and having an opening from the sensing flow channel to the fluid flow channel of the first housing part; and
level sensor components provided in the sensor flow channel at the sensor end, the level sensor components comprising:
an actuator, and
a switch component, the actuator and the switch component being arranged in the sensing flow channel such that when the pressure fluid in the fluid flow channel increases to increase the pressure in the sensing flow channel, via the opening, the pressure in the sensing flow channel moves the actuator along the fluid flow channel into engagement with the switch component to activate the switch component to provide a level detection indication.

2. The assembly of claim 1, wherein the switch component is a push-button switch having a push button extending into the sensing flow channel, with which the actuator is brought into engagement to activate the switch component.

3. The assembly of claim 2, wherein the switch component includes a switch housing from which the push button extends, the switch housing containing switching circuitry and being configured to close the sensor end of the sensor housing part.

4. The assembly of claim 3, the switch component including a microswitch.

5. The assembly of claim 2, further comprising:
a plug arranged to be received in the sensing flow channel and configured to securely receive the switch component.

6. The assembly of claim 1, wherein the actuator includes a plunger movable along the sensing flow channel responsive to the increased pressure.

7. The assembly of claim 6, further comprising:
a spring arranged to bias the plunger out of contact with the switch component until the pressure acting on the plunger exceeds the force of the spring.

8. The assembly of claim 1, wherein the actuator comprises an expandable part that is caused to expand in shape along the sensing flow channel towards the switch component as the pressure increases.

9. The assembly of claim 8, wherein the expandable part is in the form of a flexible diaphragm caused to bulge towards the switch component in response to the increase in pressure.

10. The assembly of claim 1, further comprising:
a seal located between the switch component and the sensing flow channel.

11. The assembly of claim 1, further comprising:
a valve configured to receive a level detection signal from the switch component dependent on whether or not the actuator engages with the switch component, the valve caused to open or close responsive to the level detection signal.

12. The assembly of claim 1, wherein the first housing part and the sensor housing part are formed as a single unit by additive manufacturing.

13. A fluid flow system including:
   a fluid flow conduit; and
   a fluid level sensing assembly as claimed in claim 1, positioned within and along the fluid flow conduit such that fluid flows from a first flow part of the conduit into the fluid inlet and from the fluid outlet into a second flow part of the conduit.

14. A fluid flow system as claimed in claim 13, wherein the fluid flow conduit is provided with a valve that opens or closes in response to a level of fluid detected by the fluid level sensing assembly.

15. A fluid flow system as claimed in claim 13, wherein the fluid level sensing assembly is formed as a unit fitted between the first and second flow parts of the conduit.

\* \* \* \* \*